US012651908B2

(12) United States Patent
Hafner

(10) Patent No.: US 12,651,908 B2
(45) Date of Patent: Jun. 9, 2026

(54) ENERGY SUPPORTING DEVICE

(71) Applicant: Hitachi Energy Ltd, Zürich (CH)

(72) Inventor: Ying-Jiang Hafner, Ludvika (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/783,037

(22) Filed: Jul. 24, 2024

(65) Prior Publication Data

US 2024/0380211 A1    Nov. 14, 2024

Related U.S. Application Data

(63) Continuation of application No. 18/568,549, filed as application No. PCT/EP2021/065242 on Jun. 8, 2021, now Pat. No. 12,119,655.

(51) Int. Cl.
H02J 3/36        (2026.01)
H02J 3/28        (2026.01)
(Continued)

(52) U.S. Cl.
CPC .................. H02J 3/36 (2013.01); H02J 3/28 (2013.01); H02J 7/933 (2026.01); H02M 3/158 (2013.01); H02J 2207/50 (2020.01)

(58) Field of Classification Search
None
See application file for complete search history.

(56) References Cited

U.S. PATENT DOCUMENTS 8,610,384 B2    12/2013  Dommaschk et al.
2013/0128636 A1*  5/2013  Trainer ..................... H02J 7/02
                                                              363/65
(Continued)

FOREIGN PATENT DOCUMENTS

CN        109546638 A      3/2019
EP          2834896 B1      5/2016
(Continued)

OTHER PUBLICATIONS

International Search Report for the corresponding PCT Application No. PCT/EP2021/065242 dated Mar. 1, 2022, 2 pages.
(Continued)

*Primary Examiner* — Daniel Cavallari
*Assistant Examiner* — Aqeel H Bukhari
(74) *Attorney, Agent, or Firm* — PROCOPIO, CORY, HARGREAVES & SAVITCH LLP

(57)        ABSTRACT

An energy supporting device for a high voltage direct current, HVDC, transmission system includes an energy supporting device for providing grid forming and/or virtual synchronous machine, VSM, capabilities to the HVDC transmission system. The energy supporting device comprises a plurality of cells configured to be connected to the HVDC transmission system, and a cell includes a full-bridge arrangement of power switches, an energy storage device electrically connected to the full-bridge arrangement, a resistor electrically connected between the plurality of cells and an electrical reference potential, and a bypass switch configured to allow the resistor to be bypassed. The energy supporting device is configured to be operated in a dissipation mode, in which the bypass switch is in an open state for allowing the resistor to dissipate electrical energy from the HVDC transmission system, and in which the energy storage devices of the plurality of cells are bypassed.

20 Claims, 3 Drawing Sheets

(51) Int. Cl.
  *H02J 7/00*     (2026.01)
  *H02J 7/90*     (2026.01)
  *H02M 3/158*    (2006.01)

(56)          References Cited

U.S. PATENT DOCUMENTS

| 2013/0279211 A1* | 10/2013 | Green ................... H02J 3/1814 |
| | | 363/35 |
| 2015/0028826 A1 | 1/2015 | Davidson et al. |
| 2015/0349536 A1 | 12/2015 | Davidson |
| 2016/0013649 A1* | 1/2016 | Jasim ........................ H02J 3/36 |
| | | 363/35 |
| 2016/0141962 A1 | 5/2016 | Outram |

FOREIGN PATENT DOCUMENTS

| SE | 543496 C2 | 3/2021 |
| WO | 2013068031 A1 | 5/2013 |
| WO | 2013128148 A1 | 9/2013 |
| WO | 2014131476 A1 | 9/2014 |
| WO | 2020082660 A1 | 4/2020 |

OTHER PUBLICATIONS

International Preliminary Report on Patentability for the corresponding PCT Application No. PCT/EP2021/065242 dated Oct. 2, 2023, 16 pages.

* cited by examiner

ENERGY SUPPORTING DEVICE

CROSS-REFERENCE TO RELATED APPLICATION

This application is a continuation of U.S. patent application Ser. No. 18/568,549, filed on Dec. 8, 2023, which is a national stage entry of International Patent Application No. PCT/EP2021/065242, filed on Jun. 8, 2021 which is incorporated herein by reference in its entirety.

TECHNICAL FIELD

The present disclosure generally relates to the field of power system support. More specifically, the present disclosure relates to an energy supporting device for a high voltage direct current, HVDC, transmission system.

BACKGROUND

Existing power systems have been operating robustly and reliably mainly due to the majority of power plants being based on traditional synchronous generators which provide energy buffers due to their natural mechanical mass, i.e. inertia. However, as the interest in renewable energy is increasing many of the traditional power plants will be replaced by renewable energy sources, such as, for example, wind and solar power.

Renewable energy sources mainly use power electronic converters to transmit generated energy into the power systems, unlike traditional power plants. Power electronic converters have different characteristics in comparison to traditional synchronous generators. Thus, as more and more traditional power plants are replaced by renewable energy sources, the impact due to the different characteristics of renewable energy sources will affect the power systems. The impact will result in significant challenges with regards to maintaining the stability of the power systems and recovery following faults and/or disturbances within the power systems.

The natural capabilities which were traditionally provided by synchronous generator, thereby contributing to stability within the power systems, will have to be provided by other means in the future.

In the light of the above, there is a need for power system support which can increase the stability of the power systems.

SUMMARY

To at least partially fulfil the above requirements, the present disclosure seeks to provide improved support for HVDC transmission systems.

To achieve this, an energy supporting device and a method for providing energy support as defined in the independent claims are provided. Further embodiments of the present disclosure are provided in the dependent claims.

According to a first aspect, an energy supporting device is provided. The energy supporting devices is configured for a high voltage direct current, HVDC, transmission system. The HVDC transmission system includes a first HVDC converter and a second HVDC converter connected to each other via an HVDC link. The energy supporting device comprises a plurality of cells configured to be connected in series to the HVDC link. A cell includes a full-bridge arrangement of power switches, and an energy storage device electrically connected to the full-bridge arrangement.

The energy supporting device further comprises a resistor electrically connected between the plurality of cells and an electrical reference potential. The energy supporting device further comprises a bypass switch configured to allow the resistor to be bypassed. The energy supporting device is configured to be operated in:

a charging mode, in which the bypass switch is in a closed state for allowing the resistor to be bypassed, and in which the energy storage device of at least one cell of the plurality of cells is receiving electrical energy from the HVDC link, a dissipation mode, in which the bypass switch is in an open state for allowing the resistor to dissipate electrical energy from the HVDC link, and in which an the energy storage devices of at least one cell of the plurality of cells are bypassed, and an energy release mode, in which the energy storage device of at least one cell of the plurality of cells is providing electrical energy to the HVDC link.

According to a second aspect, an HVDC transmission system is provided. The HVDC transmission system includes a first HVDC converter and a second HVDC converter connected to each other via an HVDC link. The HVDC transmission system comprises at least one energy supporting device according to the first aspect. The energy supporting device is connected to the HVDC link.

According to a third aspect, a method for providing energy support for a HVDC transmission system is provided. The HVDC transmission system includes a first HVDC converter and a second HVDC converter connected to each other via an HVDC link. The energy support is provided by means of an energy supporting device. The energy supporting device comprises a plurality of cells connected in series to the HVDC link. A cell includes a full-bridge arrangement of power switches, and an energy storage device electrically connected to the full-bridge arrangement. The energy supporting device further comprises a resistor electrically connected between the plurality of cells and an electrical reference potential, and a bypass switch configured to allow the resistor to be bypassed. The method comprises the steps of:

dissipating a surplus of electrical energy from the HVDC link by opening the bypass switch of the energy supporting device and transmitting the surplus of electrical energy to the resistor of the energy supporting device, and releasing electrical energy to the HVDC link by discharging electrical energy from the energy storage device of at least one cell of the plurality of cells.

The energy supporting device is able to provide energy storage and energy release on the DC side of an existing, or future, HVDC transmission system. By providing an energy supporting device the HVDC transmission system may provide grid forming and/or virtual synchronous machine, VSM, capability. In other words, an HVDC transmission system, which has at least one energy supporting device connected to an HVDC link of the HVDC transmission system, may provide grid forming and/or VSM capability. Thus, the energy supporting device may accommodate for grid forming and/or VSM capability which is independent to conditions of an alternate current, AC, network which the HVDC transmission system is connected to.

The energy supporting device according to the first aspect may allow for an HVDC transmission system which is connecting, for example, an offshore wind farm to an onshore grid to absorb energy from the onshore or offshore grid when a need arises, such as when the onshore grid is experiencing an over-frequency. In other words, the energy supporting device may allow for electrical energy absorption, or dissipation, when the onshore grid has a surplus of electrical energy. Dissipation of electrical energy may be performed by the energy supporting device by transmitting electrical energy from the grid through the resistor of the energy supporting device. Thus, the dissipation of electrical energy may be performed much faster than if the electrical energy would be absorbed by a conventional energy bank, such as a battery. Further, the dissipation of electrical energy may be performed at a higher current and/or voltage than if a conventional energy bank was used. The energy supporting device may thereby provide some inertia for the grids by being able to quickly absorb electrical energy. Thus, the energy supporting device may increase the stability of the grid(s) and the capability to recover from faults and/or disturbances within the grid(s), which may allow for a larger portion, or share, of renewable energy sources connected to the onshore grid.

The energy supporting device may further allow for the HVDC transmission system to release, as in feed, generate, discharge or transmit, energy from the energy storage device into onshore grid independently of the level of electrical energy production at the offshore grid, such as the wind speed at an offshore windfarm. Additionally, the consumption of electrical energy in the onshore grid may increase suddenly for which a renewable energy source may not be able to provide. The energy supporting device can be discharged into the onshore grid. In other words, the energy supporting device may be configured to act as an energy buffer for the onshore grid. Thus, the energy supporting device can dissipate electrical energy from a grid when there is a surplus of electrical energy in the grid, and release electrical energy into the grid when there is a need for additional electrical energy, such as when a power supply source is unexpectedly tripped, or when the renewable energy source is unable to produce enough electrical energy.

The energy supporting device, while in the charging mode, may be configured to absorb a small amount of electrical energy from the HVDC link, wherein the small amount may be less than 5%, or less than 1%, of the electrical energy being transmitted between the first and second HVDC converters via the HVDC link. Thus, the energy supporting device may be charged over a long period of time, without any significant impact to the transmission of electrical energy between the first and second HVDC converters.

The HVDC transmission system may comprise a plurality of HVDC converters which may be connected in series and/or in parallel. The first and second converters may comprise a plurality of interconnected converters. The HVDC transmission system may be configured for transmitting electrical energy from, for example, a power plant, a wind farm, a solar farm, or another energy generation source, to a grid. Alternatively, the HVDC transmission system may be configured for transmitting electrical energy between two grids, such as between two AC grids.

The power switches may comprise power semiconductor switches. The power switches may comprise insulated-gate bipolar transistors, IGBTs. An IGBT may, for example, be an IGBT with an anti-parallel diode or a bi-mode insulated gate transistor, BIGT.

The full-bridge arrangement of power switches may alternatively be understood as a plurality, such as four, power switches arranged in a full-bridge configuration. The full-bridge arrangement may be understood as an, for example, H-bridge arrangement. The full-bridge arrangement of a cell may be configured to control the polarity, i.e. direction of current, applied to the energy storage device of the cell. Further, the full-bridge arrangement may be configured to allow bypassing of the energy storage device.

The resistor electrically connected between the plurality of cells and the electrical reference potential may comprise a plurality of resistors. The plurality of resistors may be connected in series and/or in parallel. The electrical reference potential may be understood as, for example, an electrically ground potential, or a zero potential. The plurality of cells may comprise a first and a second terminal. The first terminal of the plurality of cells may be connected to the HVDC link. The bypass switch may be connected between the second terminal of the plurality of cells and the electrical reference potential in parallel with the resistor.

In the charging mode, the energy storage device of at least one cell of the plurality of cells may be charged by electrical energy from the HVDC link. The dissipation mode may, alternatively, be understood as a fast energy absorption mode. The energy release mode may, alternatively, be understood as a discharging mode.

The energy supporting device may further be configured to operate in:

an idle mode, in which the full-bridge arrangement of at least one of the plurality of cells is configured to block electrical energy from the HVDC link from passing through the energy supporting device.

In the idle mode at least some, or all, of the power switches of the full-bridge arrangement may be switched off. Thus, the full-bridge arrangement may be in non-conducting state or configuration. The idle mode may alternatively be understood as a blocking mode. In the idle mode, there may not be any current exchange between the energy supporting device and the HVDC link.

By providing an energy supporting which is configured to operate in, and switched to and from, the idle mode, the energy supporting device may be able to, essentially, be disconnected from the HVDC link. Thus, a higher degree of control and/or stability can be achieved with a connected energy supporting device which is able to switch from the idle mode to one of the other modes when the need arises to absorb energy from, dissipate energy from or release energy to the HVDC link.

The full-bridge arrangement of a cell of the plurality of cells may be configured to:

in the charging mode, allow the energy storage device of the cell to receive electrical energy, in the dissipation mode, allow the energy storage device of the cell to be bypassed, and in the energy release mode, allow the energy storage device of the cell to discharge electrical energy.

The full-bridge arrangement may be configured for arranging the plurality of switches in at least three different configurations, states, or modes of operation. The full-bridge arrangement may be configured for arranging the plurality of switches in three, four, five, or more different configurations, states, or modes of operation. The different configurations may be corresponding to the different modes of the energy supporting device. Thus, the plurality of switches may be in a charging configuration, a dissipation configuration, an energy release configuration and/or an idle configuration. It is to be understood that, by the term "arranging a switch" it is meant that a switch may be arranged in either of a closed state or an opened state, which corresponds to either of a turned-on state or a turned-off state. In the charging mode, the plurality of switches may be arranged such that a charging current is applied to the energy storage element, thereby charging the energy storage element. In the energy release mode, the plurality of switches may be arranged such that a discharging current, with an opposite direction of the charging current flow flowing through the energy storage element when in the charging mode, is applied to the energy storage element. In the dissipation mode, the plurality of switches may be arranged such that there is not a current flowing through the energy storage element.

The full-bridge arrangement of a cell of the plurality of cells may be configured to: in the idle mode, block electrical energy from the HVDC link from passing through the energy supporting device. In the idle mode, the plurality of switches may be arranged such that a voltage potential across the plurality of cells is higher than a voltage of the HVDC link. In the idle mode, the plurality of switches of the full-bridge arrangement may be in the opened state.

A cell of the plurality of cells may further comprise a DC/DC converter. The energy storage device of the cell may be connected to the full-bridge arrangement via the DC/DC converter.

The cell of the plurality of cells may further comprise a capacitor connected between the DC/DC converter and the full-bridge arrangement. The capacitor may be connected in parallel with the DC/DC converter and the full-bridge arrangement. The DC/DC converter may be configured to convert the voltage and/or the current of the electrical energy from the full-bridge arrangement, wherein the converted voltage and/or current may be optimized with regards to charging, discharging or releasing energy to, or from, the electrical storage device. Thus, the DC/DC converter may improve the efficiency of the energy supporting device.

The energy storage device of a cell of the plurality of cells may comprise a super-capacitor and/or a battery.

The energy storage device may comprise one or more batteries and/or one or more super-capacitors. The one or more batteries and/or one or more super-capacitors may be connected in series and/or in parallel.

The energy supporting device may further comprise a control unit configured to control the power switches of the full-bridge arrangements of the plurality of cells and the bypass switch.

The energy supporting device may comprise one or more control units. A control unit may be configured to control the power switch switches of the full-bridge arrangements of one or more of the plurality of cells. For example, the energy supporting device may comprise one control unit. Alternatively, the energy supporting device may comprise a plurality of control units configured for controlling respective one or more cell(s) of the plurality of cells.

The control unit may be communicatively connected to the full-bridge arrangements of the plurality of cells and the bypass switch so as to control a switching state of the switches. The control unit may further be configured to sense current and/or voltage at the full-bridge arrangement, the bypass switch and/or the resistor of a cell of the plurality of cells, for example by means of a sensor arrangement. The sensor arrangement may be configured to sense the voltage across each cell so as to allow for the current as well as the cell voltage to be regulated.

The energy supporting device may further comprise an impedance arranged between the plurality of cells and the bypass switch.

The impedance may comprise a resistor and/or an inductor. The impedance may be configured for regulating the current in the energy supporting device. For example, in the charging mode, some energy storage devices of a cell of the plurality of cells may be receiving electrical energy from the HVDC link, while the other cells of the plurality of cells may be bypassed. Resistance may be used to fine-tune the current through the energy supporting device, which may otherwise be too sensitive to be controlled. By providing an impedance between the plurality of cells and the bypass switch, the current may be regulated, or determined, to a more suitable level. Thus, the impedance may increase the stability and/or the controllability of the energy supporting device.

A cell of the plurality of cells may comprise a cell bypass switch configured to allow the cell to be bypassed. The cell bypass switch may be configured to bypass the cell in response to a determination that a malfunction has occurred in the cell. Thereby, the cell bypass switch may provide an increased level of protection.

The first and second HVDC converter of the HVDC transmission system may comprise a plurality of HVDC converters, wherein the first and second transmission lines may be arranged between respective HVDC converters of the first and second HVDC converters. The first and second transmission lines may comprise transmission lines and/or cables.

The HVDC transmission may be configured as a symmetrical monopole HVDC transmission system or a bipolar HVDC transmission system.

The HVDC transmission system may comprise at least two energy supporting devices according to the first aspect. A first one of the energy supporting devices may be connected to a first transmission line of the HVDC link, and a second one of the energy supporting devices may be connected to a second transmission line of the HVDC link.

The HVDC transmission system may further comprise a control system configured to control the power switches of the full-bridge arrangement of the plurality of cells and the bypass switch. The HVDC transmission system may further comprise at least one sensor configured to sense a current and/or a voltage of the HVDC link. The at least one sensor may be communicatively coupled to the control system. The control system may be further configured to cause the energy supporting device to assume one of the modes based on the received current and/or voltage of the HVDC link.

The control system may be configured to control the power switches of the full-bridge arrangement of the plurality of cells and the bypass switch via one or more control units of the energy supporting device. The control performed by the control system may be based on a support request from the AC network to which the HVDC transmission system is connected and/or based on sensed conditions at the HVDC link. The control system may be configured as a master and the control unit(s) may be configured as a slave. In other words, the control system may be configured to be perform a higher level of control, and the control unit(s) may be configured to perform a lower level of control which may be subject to the higher level of control.

The method may further comprise the step of absorbing electrical energy from the HVDC link by closing the bypass switch of the energy supporting device and transmitting the electrical into an energy storage device of at least one cell of the plurality of cells of the energy supporting device.

Thus, the absorbing of electrical energy from HVDC link allows for charging of the energy storage device(s) of the at least one cell of plurality of cells of the energy supporting device. By being able to charge the energy storage devices, the method may allow for performing the step of releasing electrical energy, or discharging electrical energy, to the HVDC link.

The step of absorbing electrical energy may further comprise transmitting the electrical energy into a number of electrical storage devices of the plurality cells. The number may be based on a sensed level of charge of the electrical storage devices. Thus, a plurality of electrical storage devices may be charged simultaneously.

The step of dissipating a surplus of electrical energy may further comprise dissipating the surplus of electrical energy from the HVDC link if a level of the surplus electrical energy of the HVDC link is above a predetermined threshold, for example indicating an electrical energy peak and/or an electrical energy transient occurring in the HVDC link. The present embodiment thereby allows for handling of, for example, a malfunction, a tripping or a sudden imbalance between grids to which the HVDC transmission is connected.

The method may further comprise performing the step of dissipating a surplus of electrical energy in response to a first support request. The method may further comprise performing the step of discharging a surplus of electrical energy in response to a second support request. The first and/or the second support request(s) may be sent from AC network to which the HVDC transmission system is connected and/or from sensor configured for sensing conditions at the HVDC link.

It is noted that other embodiments using all possible combinations of features recited in the above described embodiments may be envisaged. Thus, the present disclosure also relates to all possible combinations of features mentioned herein. Any embodiment described herein may be combinable with other embodiments also described herein, and the present disclosure relates to all combinations of features.

BRIEF DESCRIPTION OF THE DRAWINGS

Exemplifying embodiments will be described below with reference to the accompanying drawings, in which.

All the figures are schematic, not necessarily to scale, and generally only show parts which are necessary in order to elucidate embodiments of the present invention, wherein other parts may be omitted or merely suggested. Like reference numerals refer to like elements throughout.

DETAILED DESCRIPTION

Figure 1:
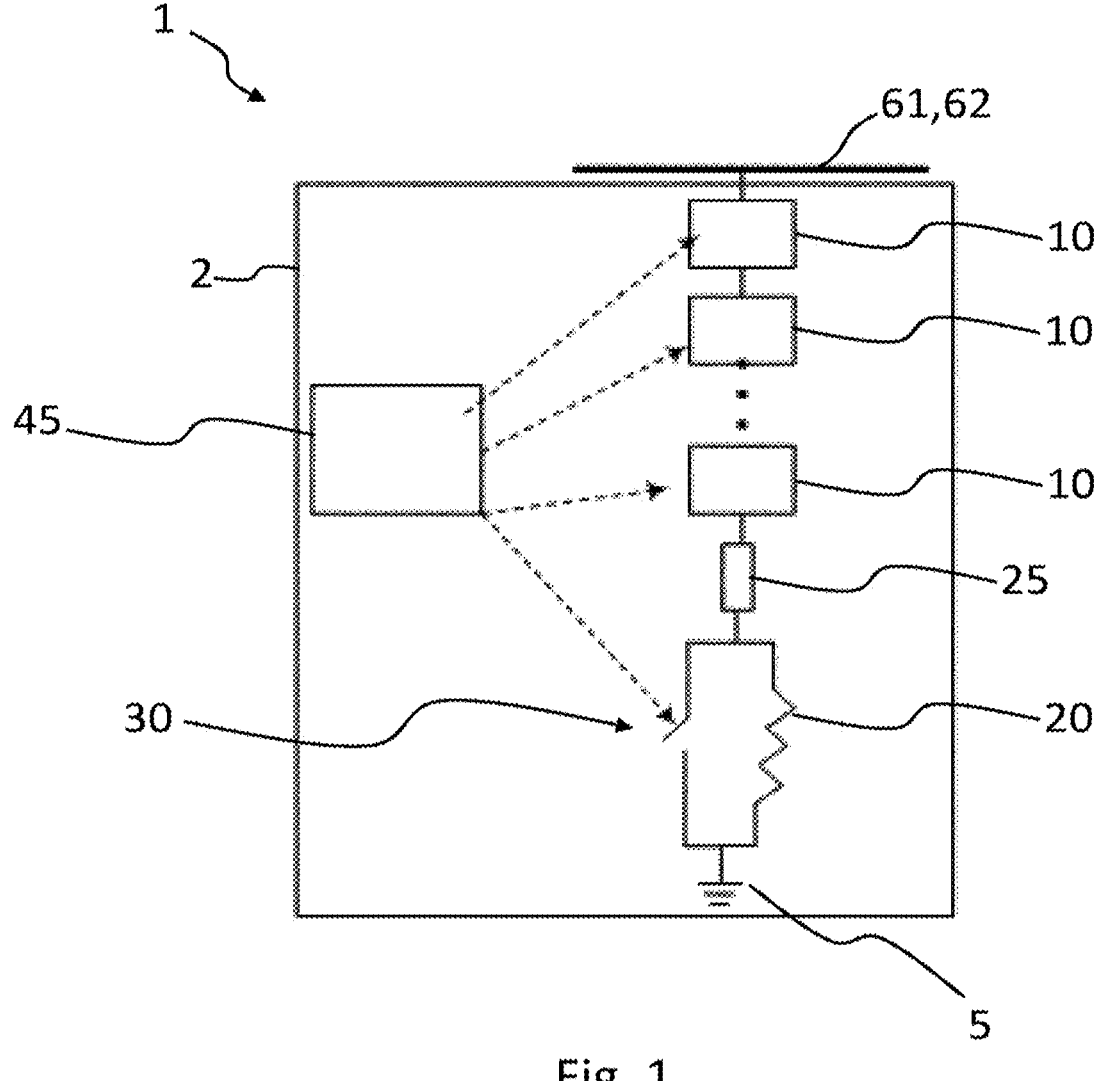
FIG. 1 is a schematic view of an energy supporting device.

The present invention will now be described hereinafter with reference to the accompanying drawings, in which exemplifying embodiments are shown. The present inventive concept may, however, be embodied in many different forms and should not be construed as limited to the embodiments set forth herein; rather, as is readily appreciated by those skilled in the art, these embodiments are provided by way of example so that this disclosure will convey the scope of the invention as defined by the appended claims. In the drawings, identical reference numerals denote the same or similar components having a same or similar function, unless specifically stated otherwise.

FIG. 1 is a schematic view of an energy supporting device 1.

The energy supporting device 1 comprises a plurality of cells 10 connected in series. It is to be understood that although FIG. 1 shows three cells 10 connected in series, the energy supporting device 1 may comprise any number of cells 10. This is further emphasized by the dashed line between two of the cells 10. The cells 10 are connected in series to a transmission line 61, 62 of an HVDC link of an HVDC transmission system (not shown; see e.g. FIG. 3). Thus, a first terminal of the plurality of cells 10, which are connected in series, is connected to the transmission line 61, 62 of the HVDC link. The first terminal of the plurality of cells 10 may be connected to the transmission line 61, 62 directly or indirectly via a disconnector. The transmission line 61, 62 may be a DC pole of the HVDC link.

The energy supporting device 1 comprises a resistor 20 and a bypass switch 30. The resistor 20 and the bypass switch 30 are electrically connected in between a second terminal of the plurality of cells 10 connected in series and an electrical reference potential 5. The electrical reference potential 5 may in some examples be understood as a ground potential or a zero potential. The bypass switch 30 is configured to allow the resistor 20 to be bypassed. Thus, the if the bypass switch 30 is in a closed state, current from the plurality of cells 10 may be transmitted via the bypass switch 30 to the electrical reference potential instead of through the resistor 20.

The energy supporting device 1 may further comprise an impedance 25. The impedance 25 is arranged between the plurality of cells 10 and the bypass switch 30. In other words, the impedance 25 may be electrically connected between the plurality of cells 10 and the bypass switch 30.

The energy supporting device 1 may further comprise a control unit 45. The control unit 45 is configured to control power switches of full-bridge arrangements (not shown; see e.g. FIG. 2) of the plurality of cells 10 and the bypass switch 30. The energy supporting device 1 may comprise communication means configured for allowing the control unit 45 to switch the power switches of full-bridge arrangements of the plurality of cells 10 and the bypass switch 30, as indicated in FIG. 1 by dashed arrows. The communication means may be configured as cables electrically connected to the power switches and the bypass switch.

The energy supporting device 1 may be operated in a charging mode, a dissipation mode, an energy release mode, and/or an idle mode.

When the energy supporting device 1 is operated in the charging mode, the full-bridge arrangement of at least one of the plurality of cells 10 is configured to allow the energy storage device of the at least one cell 10 to receive electrical energy from the transmission line 61, 62, and the resistor 20 is bypassed via the bypass switch 30. The cell(s) 10 which are not receiving electrical energy from the transmission line 61,62 may be configured to allow the energy storage device of the cell(s) 10 to be bypassed.

When the energy supporting device 1 is operated in the dissipation mode, the full-bridge arrangements of the plurality of cells 10 are configured to bypass the energy storage devices of the plurality of cells 10 and the bypass switch 30 is in an open state for allowing the resistor 20 to dissipate electrical energy from the transmission line 61, 62.

When the energy supporting device 1 is operated in the energy release mode, the full-bridge arrangement of at least one of the plurality of cells 10 is configured to allow the energy storage device of the at least one cell 10 to discharge electrical energy to the transmission line 61, 62. The cell(s) 10 which are not discharging electrical energy from the transmission line 61,62 may be configured to allow the energy storage device of the cell(s) 10 to be bypassed.

When the energy supporting device 1 is operated in the idle mode, the full-bridge arrangements of the plurality of cells 10 are in configured to block current from passing through the cells 10.

The energy supporting device 1 may further comprise a casing 20. The plurality of cells 10, the resistor 20, the bypass switch 30, the electrical reference potential 5, the impedance and the control unit 45 may be arranged inside the casing 20. It is to be understood that one or more of the components comprised by the energy supporting device 1 may be arranged outside of the casing 2. Alternatively, the electrical reference potential 5 may be arranged outside of the casing 2 at, for example, a ground surface or a structure. Further, the control unit 40 may be arranged outside of the casing 2, and the communication means of the control unit 40 may be arranged through the casing 2. The cell 10 which is connected to the transmission line 61, 62 is connected through the casing 2.

Figures 2A, 2B:
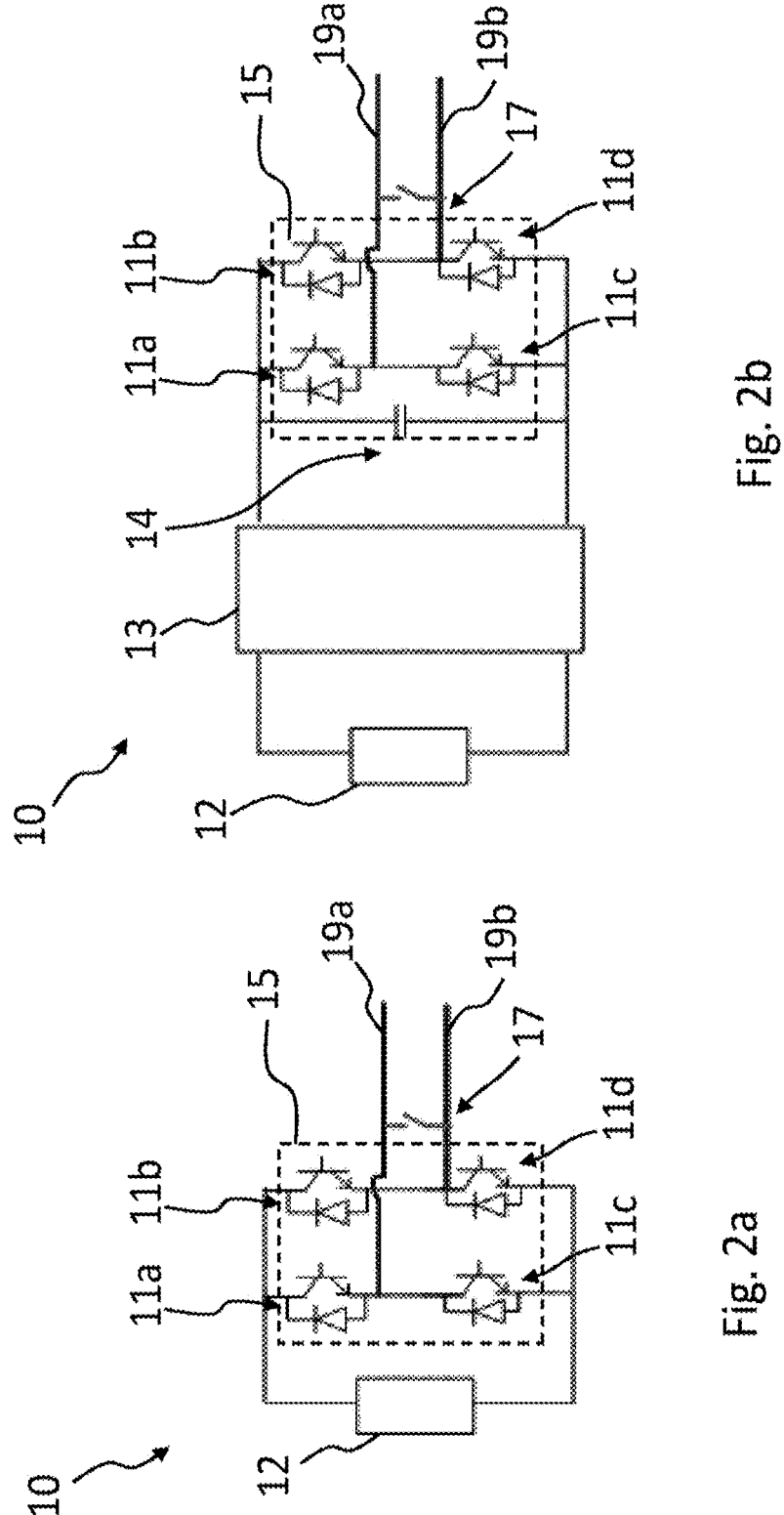
FIGS. 2a and 2b are schematic views of cells of an energy supporting device.
Figure 3:
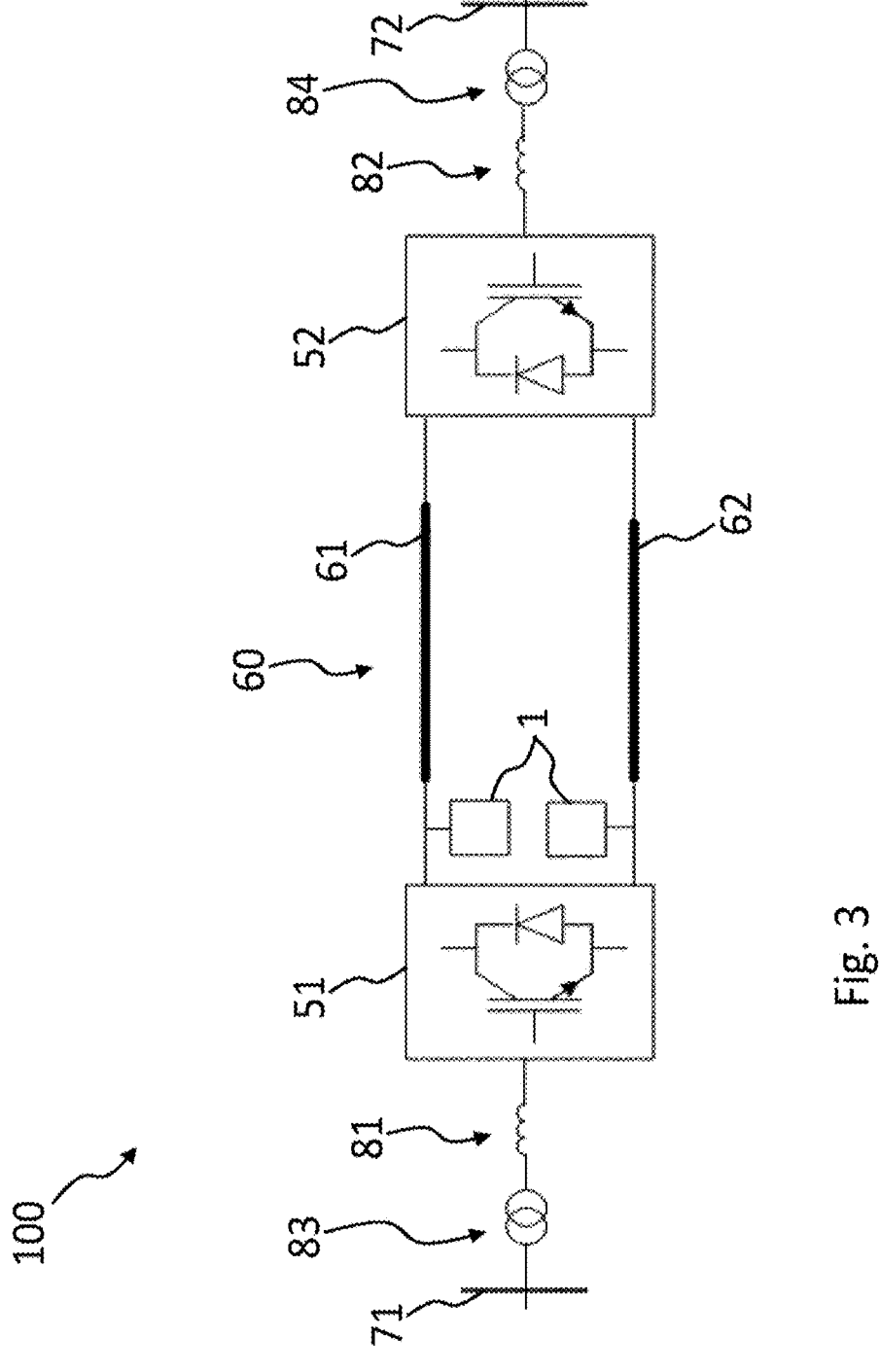
FIG. 3 is a schematic view of a HVDC transmission system.

FIG. 2a is a schematic view of a cell 10 of an energy supporting device (not shown; see e.g. FIG. 1 or 3).

The cell 10 comprises a full-bridge arrangement 15 of four power switches 11a-11d and an energy storage device 12 electrically connected to the full-bridge arrangement 15. The four power switches 11a-11d comprises a first power switch 11a, a second power switch 11b, a third power switch 11c, and a fourth power switch 11d.

The cell 10 comprises a first connection 19a and a second connection 19b. The cell may be connected to a HVDC link (not shown; see e.g. FIG. 1 or 3) or to another cell (not shown; see e.g. FIG. 1) of the energy supporting device via the first connection 19a, and to (yet) another cell of the energy supporting device or to the resistor and the bypass switch (not shown; see e.g. FIG. 1) of the energy supporting device via the second connection 19b.

The first connection 19a, the first power switch 11a, and the third power switch 11c share a common point of coupling. The second connection 19b, the second power switch 11b, and the fourth power switch 11d share a common point of coupling. The first power switch 11a, the second power switch 11b and a pole of the energy storage device 12 share a common point of coupling. The third power switch 11c, the fourth power switch 11d, and another pole of the energy storage device 12 share a common point of coupling.

Thus, when the energy supporting device is in the charging mode, the energy storage device 12 is able to receive electrical energy when the first power switch 11a and the fourth power switch 11d are in closed states. When the energy supporting device is in the dissipation mode, the energy storage device 12 is bypassed if the first power switch 11a and the second power switch 11b are in closed states, or if the third power switch 11c and the fourth power switch 11d are in closed states. When the energy supporting device is in the idle mode, all of the power switches 11a-11d are in opened state, such that no current is able to be transmitted through the cell 10.

The cell 10 may further comprise a cell bypass switch 17. The cell bypass switch is arranged between the first connection 19a and the second connection 19b. When the cell bypass switch 17 is in a closed state, the cell 10 will be bypassed. In other words, when the cell bypass switch 17 is in the closed state, current will be flowing between the first connection 19a and the second connection 19b via the cell bypass switch 17 without passing through the full-bridge arrangement 15.

FIG. 2b is a schematic view of a cell 10 of an energy supporting device (not shown; see e.g. FIG. 1 or 3).

The cell 10 shown in FIG. 2b may be similar to the cell shown in FIG. 2a except that the cell 10 shown in FIG. 2b further comprises a DC/DC converter 13 and a capacitor 14.

The DC/DC converter 13 is electrically connected between the full-bridge arrangement 15 and the energy storage device 12. The capacitor 14 is electrically connected in parallel between the DC/DC converter 13 and the full-bridge arrangement 15. Thus, the electrical storage device 12 is electrically connected to the full-bridge arrangement 15 via the DC/DC converter 13.

FIG. 3 is a schematic view of a HVDC transmission system 100. The HVDC transmission system 100 comprises a first HVDC converter 51 and a second HVDC converter 52. The first HVDC converter 51 and the second HVDC converter 52 are connected to each other via an HVDC link 60. The HVDC link 60 comprises a first transmission line 61 and a second transmission line 62.

The first HVDC converter 51 is connected to a first AC network 71 via a first inductance 81 and a first transformer 83 connected in series. The first inductance 81 and the first transformer 83 may be configured to transform the current between the first HVDC converter 51 and the first AC network 71. Correspondingly, the second HVDC converter 52 is connected to a second AC network 72 via a second inductance 82 and a second transformer 84. The second inductance 82 and the second transformer 84 may be configured to transform the current between the second HVDC converter 52 and the second AC network 72. The HVDC transmission system 100 is not limited to comprising inductors 81, 82 and/or transformers 83, 84 between the HVDC converters 51, 52 and the AC networks 71, 72.

The HVDC transmission system 100 is configured as a (symmetrical) monopole HVDC transmission system. However, it is to be understood that this is purely exemplary. For example, the HVDC transmission system 100 may be configured as a bipolar HVDC transmission system.

The second AC network 72 may comprise, be formed of, a power plant based on a renewable source, such as a wind farm or solar farm, which, for example, may be an islanded wind farm. In further examples, the second AC network 72 may be or form part of an AC network of a geographical region or country, such as a national AC grid.

The HVDC transmission system 100 comprises two energy supporting devices 1. Each energy supporting device 1 is connected, directly or indirectly, to a respective transmission line 61, 62 of the HVDC link 60. The transmission lines 61, 62 may be understood as including DC poles of the HVDC transmission system 100. The first and second converters 51, 52 may comprise a respective pole busbar to which the transmission lines 61, 62 (i.e. DC poles) are connected.

The HVDC transmission system 100 may further comprise a control system (not shown) configured to control the power switches of the full-bridge arrangement of the plurality of cells and the bypass switch and at least one sensor (not shown) configured to sense a current and/or a voltage of the HVDC link 60, 61, 62 and communicatively coupled to the control system. The control system may be further configured to cause the energy supporting devices 1 to assume one of the modes based on the received current and/or voltage of the HVDC link 60, 61, 62

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An energy supporting device for providing grid forming and/or virtual synchronous machine (VSM) capabilities to a high voltage direct current (HVDC) transmission system, wherein the energy supporting device comprises:
   a plurality of cells configured to be connected to the HVDC transmission system, wherein a cell includes:
   a full-bridge arrangement of power switches; and
   an energy storage device electrically connected to the full-bridge arrangement;
   a resistor electrically connected between the plurality of cells and an electrical reference potential; and
   a bypass switch configured to allow the resistor to be bypassed;
   wherein the energy supporting device is configured to be operated in a dissipation mode, in which the bypass switch is in an open state for allowing the resistor to dissipate electrical energy from the HVDC transmission system, and in which the energy storage devices of the plurality of cells are bypassed.

2. The energy supporting device according to claim 1, wherein the energy supporting device is further configured to operate in:
   a charging mode, in which the bypass switch is in a closed state for allowing the resistor to be bypassed, and in which the energy storage device of at least one cell of the plurality of cells is receiving electrical energy from the HVDC transmission system; and
   an energy release mode, in which the energy storage device of at least one cell of the plurality of cells is discharging electrical energy to the HVDC transmission system to thereby provide the grid forming and/or VSM capabilities.

3. The energy supporting device according to claim 2, wherein the energy supporting device is further configured to operate in:
   an idle mode, in which the full-bridge arrangement of at least one of the plurality of cells is configured to block electrical energy from the HVDC transmission system from passing through the energy supporting device.

4. The energy supporting device according to claim 2, wherein the full-bridge arrangement of a cell of the plurality of cells is configured to:
   in the charging mode, allow the energy storage device of the cell to receive electrical energy;
   in the dissipation mode, allow the energy storage device of the cell to be bypassed; and
   in the discharging mode, allow the energy storage device of the cell to discharge electrical energy.

5. The energy supporting device according to claim 1, wherein the energy storage device of a cell of the plurality of cells comprises a super-capacitor and/or a battery.

6. The energy supporting device according to claim 1, further comprising a control unit configured to control the power switches of the full-bridge arrangements of the plurality of cells and the bypass switch.

7. The HVDC transmission system comprising the energy supporting device according to claim 1, the HVDC transmission system being configured as a symmetrical monopole HVDC transmission system or a bipolar HVDC transmission system.

8. The HVDC transmission system according to claim 7, further comprising:
   a control system configured to control the power switches of the full-bridge arrangement of the plurality of cells and the bypass switch; and
   at least one sensor configured to sense a current and/or a voltage of the HVDC transmission system and communicatively coupled to the control system;
   wherein the control system is further configured to cause the energy supporting device to assume a mode based on the sensed current and/or voltage of the HVDC transmission system.

9. The HVDC transmission system according to claim 1, further comprising a first HVDC converter and a second HVDC converter connected to each other via the HVDC transmission system, wherein the first HVDC converter is coupled to a first AC network and the second HVDC converter is coupled to a second AC network.

10. The HVDC transmission system according to claim 9, wherein the first AC network comprises a power plant based on a renewable source or that is part of an AC grid.

11. A method for providing grid forming and/or virtual synchronous machine (VSM) capabilities to a high voltage direct current (HVDC) transmission system, wherein the grid forming and for virtual synchronous machine, VSM, capabilities are provided by means of an energy supporting device comprising:
   a plurality of cells connected to the HVDC transmission system, wherein a cell includes:
   a full-bridge arrangement of power switches; and
   an energy storage device electrically connected to the full-bridge arrangement;
   a resistor electrically connected between the plurality of cells and an electrical reference potential; and
   a bypass switch configured to allow the resistor to be bypassed;
   the method comprising the steps of:
   dissipating a surplus of electrical energy from the HVDC transmission system by opening the bypass switch of the energy supporting device and transmitting the surplus of electrical energy to the resistor of the energy supporting device.

12. The method according to claim 11, further comprising:
   charging, in which the bypass switch is in a closed state for allowing the resistor to be bypassed, and in which the energy storage device of at least one cell of the plurality of cells is receiving electrical energy from the HVDC transmission system; and
   releasing energy, in which the energy storage device of at least one cell of the plurality of cells is discharging electrical energy to the HVDC transmission system to thereby provide the grid forming and/or VSM capabilities.

13. The method according to claim 12, further comprising absorbing electrical energy from the HVDC transmission system by closing the bypass switch of the energy supporting device and transmitting the electrical energy into an energy storage device of at least one cell of the plurality of cells of the energy supporting device.

14. The method according to claim 13, wherein the step of absorbing electrical energy further comprises transmitting the electrical energy into a number of energy storage devices of the plurality of cells, wherein the number is based on a sensed level of charge of the energy storage devices.

15. The method according to claim 11, wherein the step of dissipating the surplus of electrical energy further comprises dissipating the surplus of electrical energy from the HVDC transmission system if a level of the surplus electrical energy of the HVDC transmission system is above a predetermined threshold.

16. The method according to claim 11, comprising:

performing the step of dissipating a surplus of electrical energy in response to a first support request; and performing the step of discharging a surplus of electrical energy in response to a second support request.

17. The method according to claim 11, further comprising:

controlling, by a control system, the power switches of the full-bridge arrangement of the plurality of cells and the bypass switch;

sensing, by at least one sensor, a current and/or a voltage of the HVDC transmission system and communicatively coupled to the control system; and causing, by the control system, the energy supporting device to assume a mode based on the sensed current and/or voltage of the HVDC transmission system.

18. The method according to claim 11, wherein a first HVDC converter and a second HVDC converter are connected to each other via the HVDC transmission system, wherein the first HVDC converter is coupled to a first AC network and the second HVDC converter is coupled to a second AC network, and wherein the first AC network comprises a power plant based on a renewable source or that is part of an AC grid.

19. The method according to claim 11, further comprising in an idle mode, the full-bridge arrangement of at least one of the plurality of cells blocking electrical energy from the HVDC transmission system from passing through the energy supporting device.

20. The method according to claim 11, further comprising controlling, by a control unit, the power switches of the full-bridge arrangements of the plurality of cells and the bypass switch.

* * * * *